Nov. 11, 1947.                A. G. CONRAD                2,430,756
             ELECTRICAL TEMPERATURE-INDICATING SYSTEM
                       Filed Nov. 29, 1944
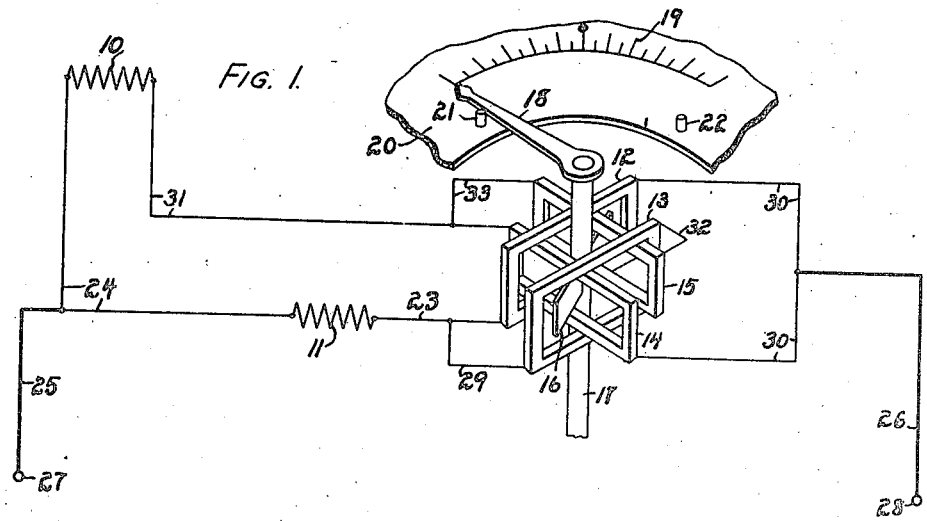
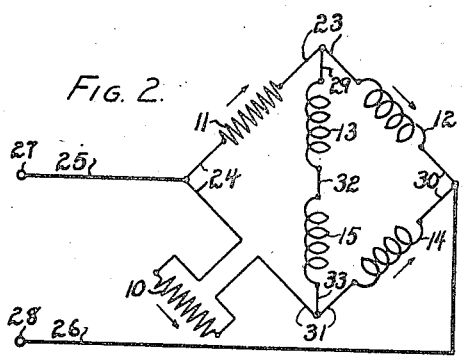
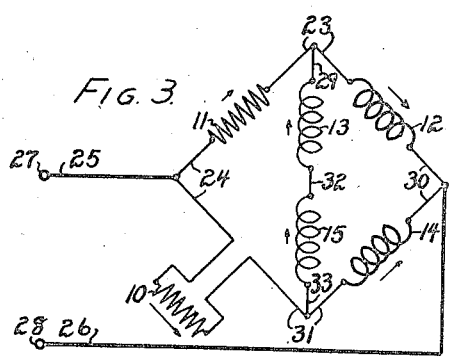
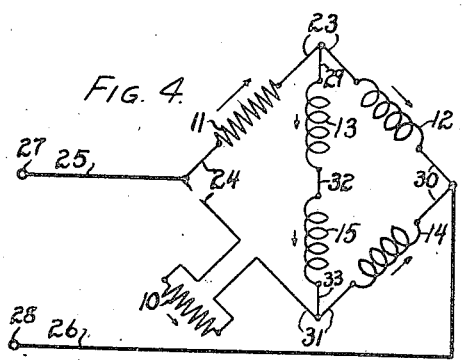
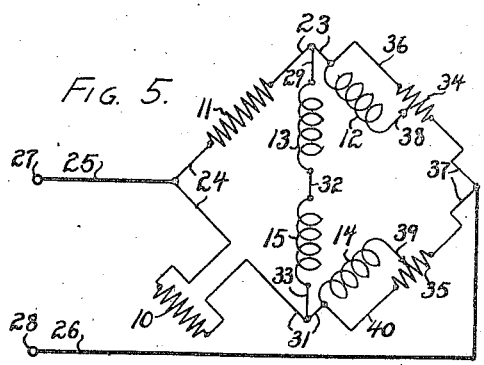
INVENTOR
ALBERT G. CONRAD
By Seymour, Carle & Nichols
ATTORNEYS Patented Nov. 11, 1947

2,430,756

UNITED STATES PATENT OFFICE 2,430,756

ELECTRICAL TEMPERATURE-INDICATING SYSTEM

Albert G. Conrad, Mount Carmel, Conn., assignor to Manning, Maxwell & Moore, Inc., Bridgeport, Conn., a corporation of New Jersey Application November 29, 1944, Serial No. 565,732

2 Claims. (Cl. 73—362)

1

The present invention relates to temperature-indicating systems or apparatus and relates more particularly to systems or apparatus whereby temperatures may be electrically indicated.

One of the objects of the present invention is to provide a superior system or apparatus of the character referred to, which is characterized by simplicity and reliability in use.

Another object of the present invention is to provide a superior electrical temperature-indicating system or apparatus which will accurately indicate at one station or location, the temperatures existing at another and relatively-remote station or location.

A further object of the present invention is to provide a superior electrical temperature-indicating system or apparatus which will function with accuracy, despite wide variations in the voltages applied thereto.

Other objects will be apparent to those skilled in the art from the following, considered in conjunction with the accompanying drawings.

In the accompanying drawings, in which certain modes of carrying out the present invention are shown for illustrative purposes:

Fig. 1 is a schematic view of an electrical temperature-indicating system or apparatus embodying the present invention;

Fig. 2 is a diagrammatic view of the electric circuit illustrating the conditions which exist when the temperature in the thermometer-element is such as to cause a balance of forces in the ratio-meter;

Fig. 3 is a view similar to Fig. 2 but illustrating the electrical unbalance of the circuit which occurs when the thermometer-element is subjected to a lower temperature than that affecting the said element under the conditions illustrated in Fig. 2;

Fig. 4 is a view similar to Figs. 2 and 3 but showing the electrical unbalance which occurs when the temperature to which the thermometer-element is subjected, rises above the temperature to which the said thermometer-element is subjected under the conditions illustrated in Figs. 2 and 3; and Fig. 5 is a diagrammatic view of a modified circuit.

The showing of Figs. 1 to 4 inclusive

The system or apparatus shown in the figures now under discussion, includes a thermometer-element 10, a balancing-resistor 11, and four armature-shifting coils respectively indicated by the reference characters 12, 13, 14 and 15.

2

In the instance shown the coils 12, 13, 14 and 15 above referred to, constitute elements of an electrical indicating-instrument of the type commonly referred to as a "ratio-meter", and serve to act upon an armature 16 in a manner as will more fully hereinafter appear.

As illustrated in Fig. 1, the coils 12, 13, 14 and 15 are of rectangular ring-like form, and the said coils are so arranged that the coils 12 and 13 extend parallel with each other in laterally-spaced-apart relationship and, similarly, the coils 14 and 15 extend parallel with each other in laterally-spaced-apart relationship. The complemental coils 12 and 13 extend at an angle with respect to the complemental coils 14 and 15, which latter extend through the coils 12 and 13. The armature 16 before referred to, is so positioned as to be acted upon by the field developed by each of the coils 12, 13, 14 and 15, and is diametrically arranged with respect to and rigidly mounted upon a shaft or arbor 17 which extends in parallelism with the faces of the said coils and is "enclosed", so to speak, within the substantially-rectangular outline provided by the respective central portions of the four coils 12, 13, 14 and 15.

The upper end of the shaft 17 is provided with a rigid radially-extending pointer or indicator 18 which is adapted to sweep over an arcuate series of graduations 19 printed or otherwise applied to the surface of a dial-plate 20. Adjacent each of the ends of the series of indicia 19, the dial-plate 20 is provided with one of two outstanding stop-pins 21 and 22 which are adapted to be engaged by and to limit the movement of the pointer 18.

One terminal of the coil 12 is connected by means of a wire 23 to one terminal of the balancing-resistor 11, which latter, in turn, has its remaining terminal connected by means of a wire 24 to one terminal of the thermometer-element 10. Intermediate its respective opposite ends the said wire 24 has connected to it a supply-wire 25 which is complemented by a second supply-wire 26. The said supply-wires 25 and 26 are respectively provided with terminals 27 and 28 to which may be connected any suitable wires leading from a source of A.-C. or D.-C. current of a suitable voltage.

One terminal of the coil 13 is connected by means of a wire 29 to an intermediate portion of the wire 23 which serves to interconnect the coil 12 and the balancing-resistor 11, as before described.

The remaining terminal of the coil 12 is connected by means of a wire 30 to one terminal of the relatively angularly disposed coil 14. The opposite terminal of the coil 14 is connected by means of a wire 31 to one terminal of the thermometer-element 10. The opposite terminal of the thermometer-element 10 is connected by means of the wire 24 before described, to one terminal of the balancing-resistor 11.

The remaining terminal of the coil 13 is connected by means of a wire 32 to one terminal of the relatively angularly disposed (Fig. 1) coil 15, while the remaining terminal of the said coil 15 is connected by means of a wire 33 to the wire 31 which extends between one terminal of the coil 14 and one terminal of the thermometer-element 10.

As before noted, the coils 12, 13, 14 and 15 constitute features of what is commonly referred to as a "ratio-meter." In the instance shown, the forces developed at a given instant by the coils 12 and 13 on the one hand, and the forces developed by the coils 14 and 15 on the other hand, while variable relative to each other are, however, always such as to oppose each other in their respective efforts to move the armature 16.

The thermometer-element 10 may be formed of any suitable material, the resistance of which changes materially with changes in the temperature to which it is subjected. The said thermometer-element may be located at a remote point with respect to the coils 12, 13, 14 and 15 and associated elements, and may be in the form of a coil formed, for instance, of heat-resistant nichrome.

By reference to Figs. 2, 3 and 4 in particular, it will be seen that the coils 12, 13, 14 and 15, the thermometer-element 10, and the balancing-resistor 11 are electrically arranged in the pattern of a Wheatstone bridge. In an electrical sense, though not necessarily in a physical sense, the thermometer-element 10, balancing-resistor 11, and coils 12 and 14 are located in the ring-portion of the Wheatstone-bridge pattern, with each thereof located in one of the four arms or sections thereof. The series-connected coils 13 and 15 may, for convenience of description, be described as being located in the bridging-portion of the Wheatstone-bridge pattern.

Operation

For purposes of description, let it be assumed that the thermometer-element 10 is so constituted that its resistance increases with a rise in its temperature and vice versa. Let it further be assumed that the resistance of the said thermometer-element 10, when at a temperature of 0° C., will exactly equal the resistance of the balancing-resistor 11.

Under the conditions just above referred to, the electrical system will be balanced as indicated by the arrows in Fig. 2, so that the angularly disposed coils 12 and 14 will have equal current-flows therethrough and hence will develop equal and opposite torques on the armature 16 or its equivalent. At this time, due to the balanced condition of the circuit, substantially no current will flow through the coils 13 and 15.

Inasmuch as the armature 16 is subjected to equal and opposite forces by the coils 12 and 14 respectively, the pointer 18 will assume a mid-position with respect to the indicia 19 on the dial-plate 20. The particular temperature at which the resistance of the thermometer-element 10 equals the resistance of the balancing-resistor 11, may, of course, be made to correspond to any desired point on a thermometer scale by suitably proportioning the thermometer-element 10 and the balancing-resistor 11.

Now let it be assumed that the temperature to which the thermometer-element 10 is subjected, falls below the arbitrarily-selected temperature of 0° C. at which the electrical system balances. Under the conditions just referred to, the resistance of the thermometer-element 10 will fall with the temperature and hence a greater current will flow therethrough and a lesser current will flow through the balancing-resistor 11, as indicated in Fig. 3.

The system will thus become unbalanced and the previously-idle coils 13 and 15 will have a current-flow therethrough to effect their activation, while at the same time the coils 12 and 14 are energized.

Under the conditions just above referred to, and due to the particular relationships of the coils 12, 13, 14 and 15, the forces developed by the coil 13 will oppose those developed by its complemental coil 12, while at the same time the forces developed by the coil 15 will be such as to aid its complemental coil 14 in deflecting the armature 16. Thus, the net result will be that the armature 16 will be turned in a direction to deflect the pointer 18 toward the low-temperature end of the band of indicia 19. The degree of turning movement of the armature 16 will be in proportion to the unbalance caused in the circuit by the lowering of the resistance of the thermometer-element 10, and hence the indicia 19 may be so arranged as to give direct and accurate indication of the actual temperature to which the thermometer-element 10 is subjected at any given time.

Should the thermometer-element 10 be subjected to a rise in temperature, such as to bring it up above 0° C., the electrical system will become unbalanced in the opposite direction, as indicated in Fig. 4. Under the conditions just referred to, the resistance of the thermometer-element 10 will increase with the rise in temperature, so that less current will flow therethrough and more of the current will flow through the balancing-resistor 11.

The increase in current-flow through the balancing-resistor 11, as above described, will cause current to flow through both of the coils 13 and 15, but in the direction opposite to the direction in which the current flowed under the conditions illustrated in Fig. 3.

Under the unbalanced condition of the circuit as illustrated in Fig. 4, the forces developed by the current-flow through the coil 13 will be added to those developed by the current-flow through the complemental coil 12, while at the same time the forces developed by the current-flow through the coil 15 will be opposed by the forces developed in the coil 14.

Due to the relationship of the forces respectively developed by the coils 12, 13, 14 and 15 as above described, the armature 16 or its equivalent will be turned so as to shift the pointer 18 toward the high-temperature end of the band of indicia 19. This movement of the armature 16 and the pointer 18 will be always proportional to the degree of unbalance and hence in accord with the rise in temperature to which the thermometer-element 10 is subjected at any given time.

The showing of Fig. 5

In the event that it is desired to extend the sweep of the pointer 18, or its equivalent, over a much longer series of indicia such as 19, to thus give more minute indications of temperature changes, the arrangement illustrated in Fig. 5 may be resorted to.

The apparatus illustrated in Fig. 5 corresponds to that shown in the preceding figures with the exception that the respective right-ends of the coils 12 and 14, instead of being directly interconnected, are connected respectively through resistors 34 and 35.

The resistor 34 is connected to the wire 23 which extends between the balancing-resistor 11 and the coil 12, by means of a wire 36. The opposite terminal of the resistor 34 is connected by means of a wire 37 to the similar end of the resistor 35 and hence, also, to the supply-wire 26. The right-end of the coil 12 is provided with an adjustable-contact 38 which may be shifted with respect to the resistor 34, to thus bring the forces developed by the coil 12 into equality with or into any desired relationship with respect to the forces developed by the complemental coil 13.

The right-end of the coil 14 is also provided with an adjustable-contact 39 which may be shifted with respect to the resistor 35, to thus adjust the value of the forces developed by the coil 14 with respect to those developed by the complemental coil 15. The end of the resistor 35 opposite the wire 37 is connected by means of a wire 40 to the wire 31.

General

Both forms of the invention shown in the accompanying drawings and herein described, are characterized by two pairs of coils so interconnected that the members of the given pair of coils aid each other in turning the armature 16, while at the same time the members of the other pair of coils are working in opposition to each other except, of course, when the electrical system is balanced as indicated in Fig. 2.

By means of the foregoing arrangement of elements, a simple, reliable and low-cost means is provided for accurately indicating temperatures.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A temperature-indicating system, including in combination: an indicator; movable armature-means operatively connected to the said indicator to shift the same; a first pair of stationary armature-shifting coils located adjacent the said armature-means in position to urge the same to move in one direction; a second pair of stationary armature-shifting coils also located adjacent the said armature-means in position to move the the same in a direction opposite to that of the said first pair of armature-shifting coils; a balancing-resistor; and a thermometer-element; the said two pairs of armature-shifting coils, the said balancing-resistor and the said thermometer-element being electrically interconnected in a Wheatstone-bridge pattern; one of the first pair of armature-shifting coils and one of the second pair of armature-shifting coils being in series and located in the bridging-portion of the Wheatstone-bridge pattern; the said balancing-resistor and the said thermometer-element being in the ring-portion of the Wheatstone-bridge pattern on one side of the bridging-portion thereof; and the remaining two armature-shifting coils being located in the ring-portion of the Wheatstone-bridge pattern on the side thereof opposite the side in which the said balancing-resistor and thermometer-element are located; the balancing-resistor, thermometer-element and two pairs of armature-shifting coils being arranged and proportioned so that when the said thermometer-element is at a predetermined temperature, the bridging-portion of the Wheatstone-bridge pattern will have no current flowing therethrough; and when the said thermometer-element has its resistance changed by the lowering of its temperature, the said bridging-portion will have current diverted therethrough in one direction and diverted therethrough in the opposite direction when the resistance of the said thermometer-element increases as a result of a rise in its temperature.

2. A temperature-indicating system, including in combination: an indicator; movable armature-means operatively connected to the said indicator to shift the same; a first pair of stationary armature-shifting coils located adjacent the said armature-means in position to urge the same to move in one direction; a second pair of stationary armature-shifting coils also located adjacent the said armature-means in position to move the same in a direction opposite to that of the said first pair of armature-shifting coils; a balancing-resistor; and a thermometer-element; the said two pairs of armature-shifting coils, the said balancing-resistor and the said thermometer-element being electrically interconnected in a Wheatstone-bridge pattern; one of the first pair of armature-shifting coils and one of the second pair of armature-shifting coils being in series and located in the bridging-portion of the Wheatstone-bridge pattern; the said balancing-resistor and the said thermometer-element being in the ring-portion of the Wheatstone-bridge pattern on one side of the bridging-portion thereof; and the remaining two armature-shifting coils being located in the ring-portion of the Wheatstone-bridge pattern on the side thereof opposite the side in which the said balancing-resistor and thermometer-element are located; and two resistors respectively connected to the two said armature-shifting coils which are in the ring-portion of the Wheatstone-bridge pattern.

ALBERT G. CONRAD.

REFERENCES CITED

The following references are of record in the file of this patent:

UNITED STATES PATENTS

| Number | Name | Date |
|---|---|---|
| 1,713,850 | McCoy | May 16, 1929 |

FOREIGN PATENTS

| Number | Country | Date |
|---|---|---|
| 8,602 | Great Britain | 1913 |
| 268,453 | Great Britain | April 5, 1927 |
| 311,535 | Great Britain | May 16, 1929 |